United States Patent [19]

Hansen et al.

[11] Patent Number: 4,972,722

[45] Date of Patent: Nov. 27, 1990

[54] MAGNETIC INDUCTIVE FLOW METER

[75] Inventors: Henning M. Hansen; Frands W. Voss, both of Sønderborg, Denmark

[73] Assignee: Danfoss A/S, Nordborg, Denmark

[21] Appl. No.: 393,643

[22] Filed: Aug. 14, 1989

[30] Foreign Application Priority Data

Aug. 26, 1988 [DE] Fed. Rep. of Germany ....... 3829063

[51] Int. Cl.$^5$ .............................................. G01F 1/60
[52] U.S. Cl. .................................................. 73/861.17
[58] Field of Search ........... 73/861.17, 861.16, 861.12, 73/3

[56] References Cited

U.S. PATENT DOCUMENTS 4,676,112  6/1987  Uematsu et al. ................. 73/861.17

FOREIGN PATENT DOCUMENTS

3303017  7/1984  Fed. Rep. of Germany .

Primary Examiner—Donald O. Woodiel
Attorney, Agent, or Firm—Wayne B. Easton

[57] ABSTRACT

The invention relates to a magnetically inductive flow meter which generates a combined signal made up of a coil generated alternating voltage and an alternating simulated voltage. An evaluating circuit processes the combined signal to determine a flow rate output value in a manner which minimizes the temperature and time drift influences on the components of the flow meter.

11 Claims, 4 Drawing Sheets

MAGNETIC INDUCTIVE FLOW METER

BACKGROUND OF THE INVENTION

The invention relates to a method of magnetic-inductive flow measurement in which a measurement produced by a periodically alternating sectionally constant magnetic field is processed in a section of every half period, and to a magnetic-inductive flow meter, especially for performing this method, comprising a coil producing a magnetic field, a magnetic field control circuit, an electrode arrangement disposed substantially perpendicular to the magnetic field and to the flow direction, an amplifier connected to the electrode arrangement and an evaluating circuit.

DESCRIPTION OF THE RELATED ART

To test the function of a flow meter or perform a calibration, it is known to use a simulating signal instead of the measurement by the electrode arrangement. The simulator producing this signal may be an external appliance which is used only for setting or maintenance purposes. However, it is also known to build a simulator into the measurement converter so that a test for function or a calibration thereof can be conducted simply by changing over to simulator operation. However, during simulator operation, the connection between the electrode arrangement and the measurement converter is interrupted or the simulating signal is superimposed on the measurement. Consequently, a function test can not normally be performed with the aid of the simulator without interfering with or interrupting the flow measurement. From DE-PS 33 03 017, it is known to connect a measurement signal and a test signal to the converter alternately in order to compare the test signal with a desired value. However, this method has the disadvantage that a dead period is produced, which can lead to considerable errors particularly in the case of measuring small flow quantities.

U.S. Pat. No. 4,704,908 discloses scanning of the signal voltage in each half period during a measuring signal scanning interval and storing the signal obtained by scanning. To compensate an interfering DC voltage superimposed on the measuring signal, during a compensating interval following each measuring signal scanning interval within the same half period, a compensating voltage is produced by scanning and storing the signal voltage. The compensating voltage compensates the signal voltage within the compensating interval to the value zero. The compensating voltage is stored and superimposed on the signal voltage up to the next compensating interval. During a correcting scanning interval following each compensating interval within the same half period, the signal voltage is scanned again and the signal value thereby obtained is likewise stored. To obtain a useful signal value, first the difference is formed between the stored signal values obtained between every two compensating intervals in different half periods and then the difference between differential values obtained in this manner. Such a system merely serves to suppress interfering voltages. The errors in the measurement converter occurring during a time and temperature drift can, however, neither be recognised nor corrected by this system.

Another problem in the arrangement disclosed in DE-OS 35 37 752 is that the signal values are deposited in four parallel stores. This has the disadvantage that an error in the calculated output value occurs even upon a slight time and/or temperature drift because one quantity changes in relation to the other.

SUMMARY OF THE INVENTION

It is the problem of the present invention to provide a method in which the temperature and/or time drift influences of the components of a measurement converter on the output value are substantially minimised.

This problem is solved in a method of the aforementioned kind in that a sectionally constant simulating quantity is produced so that it changes in synchronism with the magnetic field and is processed in a further section of each half period alternately with the measurement in the same way as the measurement is processed to form output values.

Upon a change in the magnetic field in the coil, it will take some time because of the inductance of the coil until a stable condition has been reached. During this time, even with a constant flow the electrode output signal is not constant because of the changing magnetic field, so that during this time the output signal of the electrode arrangement cannot be employed as a measurement. Instead of the measurement, the simulating quantity can be produced and processed during this time without interfering with the measurement and without a dead period occurring. By reason of the fact that the simulating quantity is processed in the same way as the measurement, it is possible to detect slow time departures of the components of the measurement converter or of the evaluating circuit because the simulating quantity is influenced in the same way as is the measurement.

Various types of processing the simulating quantity are possible. It is of advantage if the measurement or its output value is compared with the simulating quantity or its output value. Hitherto, it was known to employ a simulator for calibration or recalibration of an evaluating circuit. This usually takes place in that one adjusts the measurement converter and the evaluating circuit during simulator operation until the output value has been set within certain limits in a range about a desired value. However, this was not able to avoid a change in the marginal conditions for the calibration in the case of a change in duration of the evaluating circuit or the measurement converter, thereby resulting in a falsified measuring result. According to the invention, the calibration is undertaken during measurement by the comparison between the simulating quantity and the measurement. A time change in the values of the components of the measurement converter up to the evaluating circuit is thereby compensated.

It is of advantage if the measurement and the simulating quantity are compared after processing. This ensures that all elements that could undergo a time and temperature drift were traversed by the measurement and the simulating quantity. Thus, all changes can be incorporated in the permanent calibration.

In another solution of the problem in a method of the aforementioned kind, successive output values of the measurement and possibly of the simulating quantity are serially stored in successive storage positions. Upon production of a new output value of the measurement or of the simulating quantity, the existing output values are stored in the next following storage position and the evaluation is undertaken by using the contents of at least two storage positions. The evaluation normally takes place by means of a computer or processing apparatus.

Since the scanned values occur successively, they have to be stored until they can be processed with each other. In contrast with four stores in parallel as known from DE-OS 35 37 752, in the method of the invention the quantities are stored serially so that each measurement makes contact with each storage position. This ensures that a change in a store affects all measurements so that the ratio between the measurements remains unaltered.

Preferably, the output values of the measurement and of the simulating quantity are read out separately from the storage positions and processed separately. This ensures that the measurement and the simulating quantity are processed in the same way and under the same conditions, only with a slight offset with respect to time.

In a preferred method, at least three successive output values of the measurement or simulating quantity are stored and then processed together. A known problem in magnetic-inductive flow meters is that the DC voltage level of the measurement can change slowly or suddenly. This changes the difference between the positive and negative half period of the measurement produced by the reversed magnetic field, whereby an error is produced in evaluating the flow rate. This error can be substantially eliminated if a measurement is compared with the sum of the two measurements from the preceding and the succeeding half period.

It is in this case preferred that a processing quantity be formed from the difference between twice the second output value and the sum of the first and third output values. One thereby achieves good averaging out and therefore eliminates changes in the DC voltage level of the measurement with satisfactory accuracy. According to this principle, a larger number of measurments can be compared with each other when using a plurality of storage positions.

It is of particular advantage if the flow rate is formed in proportion to the ratio of the processing quantity of output values of the measurement and the processing quantity of output values of the simulating quantity. In this way, the permanent calibration can be achieved in a simple manner. Any eventual disruptions in the evaluating circuit also have an effect on the measurement and the simulating quantity. However, the ratio between the two quantities remains unchanged in principle, whereby an accurate flow measurement is ensured every time. Since it is known what flow must be normally produced for a measurement corresponding to the simulating quantity, the quotient thus formed can simply be multiplied by a constant factor to make an accurate statement about the flow quantity.

Preferably, pulse width modulated pulses are obtained from the processing quantity. A pulse width modulation is relatively insensitive to noise voltages and other disruptions to the measurement. Pulse widths can be easily processed. One merely needs a relatively accurate time cycle basis. However, such a basis is available in practically all evaluating units, especially in an evaluating unit with a processor.

It is preferred that the flow rate measurement be formed with the aid of four successive pulses, the flow rate being proportional to the quotient of the pulse width difference between the second and fourth pulses and the pulse width difference between the first and third pulses. This results in a relatively simple evaluation.

In a preferred embodiment, the simulating quantity assumes a constant first input value over a first section which is larger than the half period and a constant second input value over a second section which is smaller than the half period, the change between the two input values lying between a measurement signal measuring period and a simulating signal measurement period. The instant of changing the input value of the simulating quantity is selected so that it lies between a simulating signal period and a measurement signal measuring period so that any interfering voltage occurring during the change-over will not influence one of the measured values if possible. Since the simulating quantity is scanned only in a quarter period during a half period, the simulating quantity can for example also be formed so that it has a pulse width of a quarter period duration in the positive range and a pulse width of ¾ quarter period duration in the negative range. The simulating quantity is thus constant over a longer period, which can have a decided advantage if the electrode arrangement reacts very sensitively to external influences.

It is of particular advantage that the second input value of the simulating quantity be produced periodically alternately either in the first or in the second half period. For calculating the flow, there is in principle no difference whether the simulating quantity is of the same phase as the measurement, i.e. positive, when the measurement is likewise in the positive range, or displaced in phase through 180°, i.e. is in the positive range when the measurement is in the negative range. However, there could be the problem that the simulating quantity influences the evaluating circuit or the measurement converter. In the first case, that is to say when the simulating quantity and measurement have the same phase, it is mainly the positive flow measurement period that is influenced whereas in the second case it is mainly the negative measurement period which is influenced. To eliminate this error, the two possible cases are periodically changed so that possible errors produced thereby balance each other out.

In another preferred manner of processing, the output value of the simulating quantity is preferably compared with a desired value. One can thereby continuously control the correct function of the convertor or of the evaluating circuit.

It is a particular advantage if an alarm is actuated for a predetermined departure of the output value of the simulating quantity from the desired value. This is particularly desirable in the case of computer measurements.

It is another problem of the present invention to provide a magnetic-inductive flow meter which substantially minimises the temperature and/or time drift influences of its components on the output value.

This problem is solved in a magnetic-inductive flow meter of the aforementioned kind in that provision is made for a simulating signal generator for producing a simulating quantity, the generator being connected to one input of a change-over switch, the amplifier is connected to the other input of the change-over switch and the outlet of the change-over switch is connected to the evaluating circuit.

By means of this flow meter, one readily brings about the change between the measurement and the simulating quantity so that both can be evaluated by the same evaluating circuit.

In a preferred embodiment, a cycle generator in the flow meter supplies the magnetic field control circuit and the simulating signal generator with first pulses of a first cycle frequency and supplies the change-over switch with second pulses of a cycle frequency which is twice as high. Upon occurrence of a cycle pulse, the magnetic field control circuit reverses the direction of the magnetic field, the simulating signal generator changes the simulating quantity between a predetermined first input value and a predetermined second input value, and the change-over switch changes over. By "occurrence of a cycle pulse" we mean the rising or falling flank of such a pulse. Thus, the change-over switch switches two and fro between the simulating quantity and the measurement twice during each half period, the simulating quantity and measurement changing twice between their two values during each period. This ensures that during each half period the simulating quantity is scanned and processed once and the measurement also once.

Preferably, the evaluating circuit comprises an integrator which is connected to the outlet of the change-over switch and which is reset to its starting value by each negative and each positive flank of the second cycle pulse. An integrator substantially eliminates the interfering noise voltage. By reason of the fact that it is reset to its starting value by the second cycle pulses, i.e. during each changing over of the change-over switch, it integrates the measurement and simulating quantity separately during a ¼ period.

In a preferred embodiment, the evaluating circuit comprises a frequency-dependent damping element which is disposed between the output of the change-over switch and the input of the integrator. The operation of the integrator is thus independent of the selected measuring frequency. When halving the measuring frequency, the signal level is halved by the damping element.

Preferably, the evaluating circuit comprises a shift register which has at least two storage positions, is connected to the output of the integrator, and, on occurrence of the second pulses, stores the actual value of the integrator output in the first storage position and displaces the previous content of all storage positions by one storage position. Sufficient measurements are thereby available for eliminating errors caused by time averaging the difference between the positive and negative half period of the alternating measurement.

It is particularly preferred for the shift register to have five storage positions. Since the measurement and the simulating quantity are scanned alternately, the content of the shift register is therefore always either simulating quantity - measurement - simulating quantity - measurement - simulating quantity or measurement - simulating quantity - measurement -simulating quantity - measurement. The individual quantities arose out of time-displaced measurements. Consequently, there will always be a sufficient number of values for the measurement as well as the simulating quantity in order to obtain a time average.

Preferably, a summation circuit is connected to the shift register to form the difference between the sum of the content of the first and fifth storage positions and twice the content of the third storage position. This leads to a relatively simple manner of calculation.

It is of particular advantage if the evaluating circuit comprises a pulse width modulating device which, from quantities obtained from the output values of the integrator, forms evaluating pulses having widths depending on the quantities. A pulse width-modulated signal is relatively easy to process further. It is only necessary for a time base with an adequately high resolution to be available so that the duration of the pulses can be measured. This makes an analogue/digital conversion possible substantially without interferences.

Advantageously, the flow meter comprises a computer device which correlates the evaluating pulses in groups of four and forms the flow proportionally to the quotient of the difference in the widths of the second and fourth pulses and the difference in the widths of the first and third pulses.

Preferred examples of the invention will now be described with reference to the drawing, wherein.

DESCRIPTION OF PREFERRED EMBODIMENTS

Figure 1:
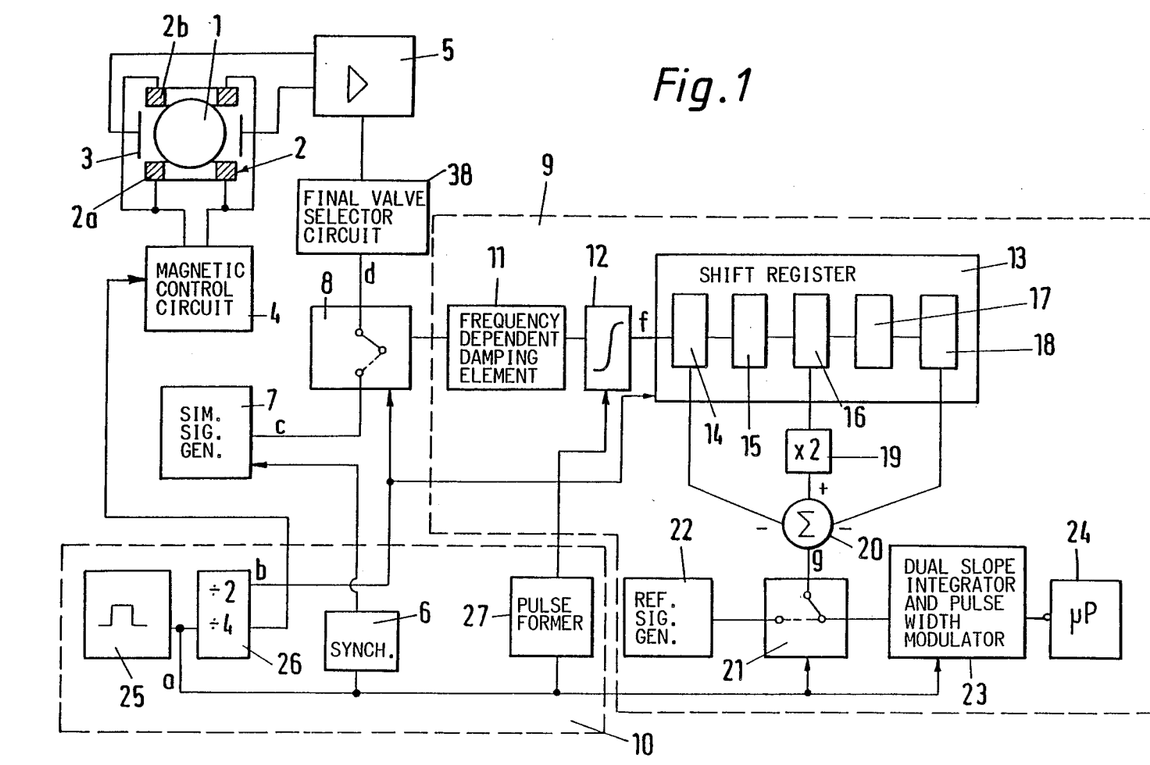
FIG. 1 illustrates a magnetic-inductive flow meter.

FIG. 1 illustrates a magnetic-inductive flow meter which measures the flow of a fluid flowing through a tube 1. A magnetic control circuit 4 is connected to a coil 2 which, in the present example, is formed by two coil halves 2a and 2b and produces a magnetic field in the tube 1 perpendicular to the direction of flow. Substantially perpendicular to the flow direction and perpendicular to the direction of the magnetic field produced by the coil 2, there is an electrode arrangement 3 connected to an amplifier 5. The electrode arrangement 3 measures in known manner an electric quantity produced by the magnetic field and the fluid flow. The output of the amplifier 5 is connected to the final value selector circuit 38 with which a user can set the desired final value. This circuit 38 is connected to one input of a change-over switch 8. The other input of the change-over switch 8 is connected to a simulating signal generator 7. The simulating signal generator 7 is connected to a synchronizing circuit 6 which is controlled by the cycle generator 25 and synchronises the scanning frequency of the electrode arrangement 3 with the magnetising frequency of the magnet control circuit 4. The output of the change-over switch 8 is connected to an evaluating circuit 9.

The evaluating circuit 9 comprises an integrator 12 of which the input is connected by way of a frequency-dependent damping element 11 to the output of the change-over switch 8. The frequency-dependent damping element 11 damps the input level of the integrator 12 proportionally to the frequency with which the change-over switch 8 is changed over, i.e. at half the frequency, the input level of the integrator 12 is likewise only half the size. This avoids over control of the circuit components downstream of the integrator output. The output of the integrator 12 is connected to a shift register 13 with five storage positions 14 to 18. The first storage position 14 and the fifth storage position 18 are connected to the inverting inputs of a summation circuit 20 whereas the third storage position 16 is connected to the positive input of the summation circuit 20 by way of a multiplier 19 which doubles the value of the content of the third storage position 16. The summation circuit 20 thus forms the difference from twice the third storage position less the sum of the content of the first and fifth storage positions.

The summation circuit 20 is connected to one input of a second change-over switch 21. The second input of the second change-over switch 21 is connected to a reference signal generator 22. The output of the second change-over switch 21 is connected to a dual slope integrator and pulse width modulator 23 of which the output is connected to the input of a microprocessor 24. The dual slope integrator integrates the value delivered by the summation circuit 20 over a predetermined duration. Using the value reached at the end of the predetermined duration as a starting value, it integrates in the other direction with the constant voltage delivered by the reference signal generator, so that a triangular signal is obtained of which the two flanks generally have a different gradient. The pulse width modulator determines the time necessary for the integrator to integrate back to zero again from the starting value reached at the end of the first predetermined duration.

The flow meter also comprises a cycle producing circuit 10. A cycle generator 25 is connected to the second change-over switch 21 and the dual slope integrator and pulse width modulator 23. The second change-over switch 21 is changed over on the occurrence of each cycle pulse whereas the dual slope integrator and pulse width modulator 23 changes its integrating direction on the occurrence of each cycle pulse. The cycle generator 25 is further connected to a divider 26 which on the one hand divides the cycle frequency by the factor 2 and feeds this halved cycle frequency to the change-over switch 8 and the shift register 13 and on the other hand divides it by the factor 4 and feeds this frequency to the magnetic control circuit 4. On the occurrence of a cycle pulse, the magnetic control circuit 4 reverses the magnetic field in the coil 2 and the simulating signal generator 7 changes from a first predetermined value to a second predetermined value and vice versa. The change-over switch 8 changes over between the measurement and the simulating quantity. The cycle generator 25 is further connected to a pulse former 27 which, for each rising flank of the cycle signal, generates a pulse which resets the integrator 12 to its starting value.

Figures 2, 3:
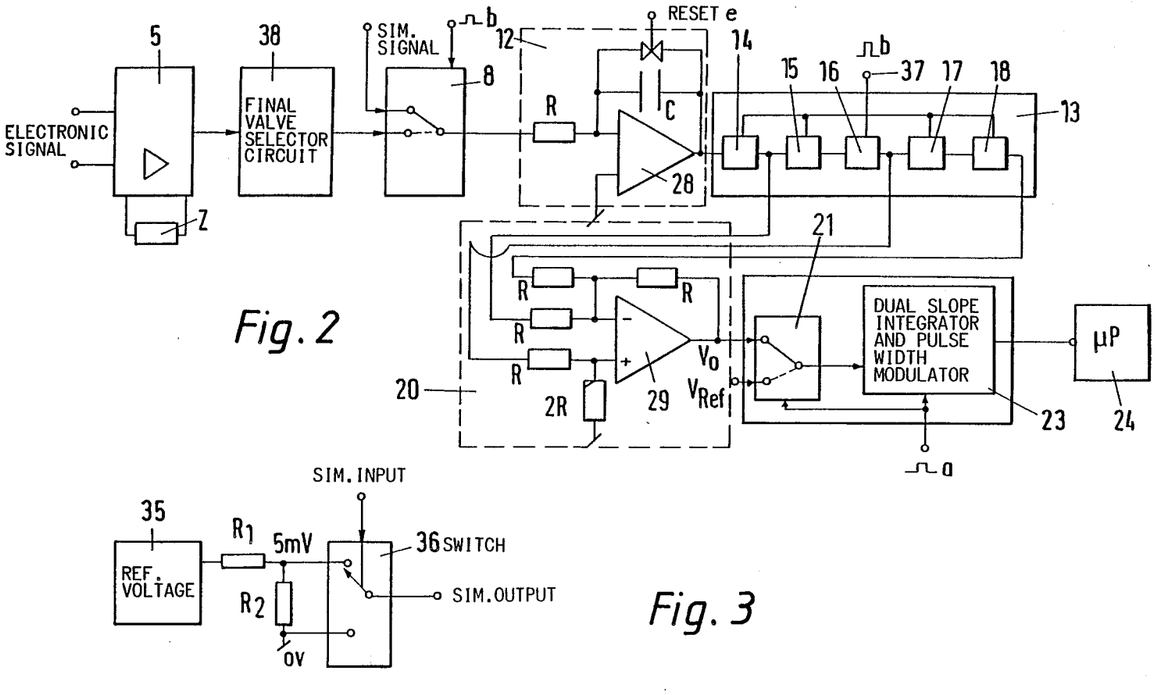
FIG. 2 shows part of the flow meter in detail.
FIG. 3 illustrates one embodiment of the simulating signal generator.

FIG. 2 shows the construction of the integrator 12 and the summation circuit 20. The signal coming from the electrodes 3 is amplified in the amplifier 5 of which the amplification factor can be adjustable from the outside by an impedance Z. The output signal of the amplifier 5 passes through the final value selector circuit 38 to the change-over switch 8 which may be formed by a multiplexer.

The integrator connected to the output of the change-over switch 8 is formed by an operational amplifier 28, a resistor R and a condenser C. Upon occurrence of a reset pulse from the pulse former circuit 27, the condenser C is short-circuited, the output value of the integrator being set to zero. The frequency-dependent damping element 11 is omitted from FIG. 2 for the sake of clarity.

The shift register 13 moves the content of the storage positions by one to the right for each cycle pulse at the input 37. The instantaneous output value of the integrator 12 is retained in the storage position 14. The output of the first storage position 14 and the output of the fifth storage position 18 are connected by way of resistors R to the inverting input of an operational amplifier 29 in the return lead of which there is a resistor R of equal size. The output of the third storage position 16 is connected by way of an identical resistor R to the non-inverting input of the operational amplifier 29. Between the non-inverting input of the operational amplifier 29 and earth there is a resistor to R of twice the size. This creates a summation circuit which, from twice the content of the third storage position 16, subtracts the sum of the contents of the first storage position 14 and the fifth storage position 18. When the first, third and fifth storage positions 14, 16 and 18 store the measurement or simulating quantity, the second and fourth storage positions 15 and 17 each store the simulating quantity or measurement, respectively. Thus, the summation circuit 20 always only interlinks quantities of the same kind.

FIG. 3 illustrates a simple embodiment of a simulating signal generator. A reference voltage source 35 is connected to earth by a voltage divider R1, R2. The simulating quantity is derived across the second resistor R2. For this purpose, a change-over switch 36 switches the simulating signal generator output to and fro between the junction of R1 and R2 and earth. The simulating quantity is therefore a rectangular signal of which the two values are, for example, 0 V and 5 mV. It is, of course, also conceivable to construct the simulating signal generator such that the simulating quantity is distributed symmetrically to the zero axis. However, this is insignificant because the summation circuit 20 following the integrator 12 eliminates an offset voltage and it is only the difference between the two values of the simulating quantity that is important.

Figure 4:
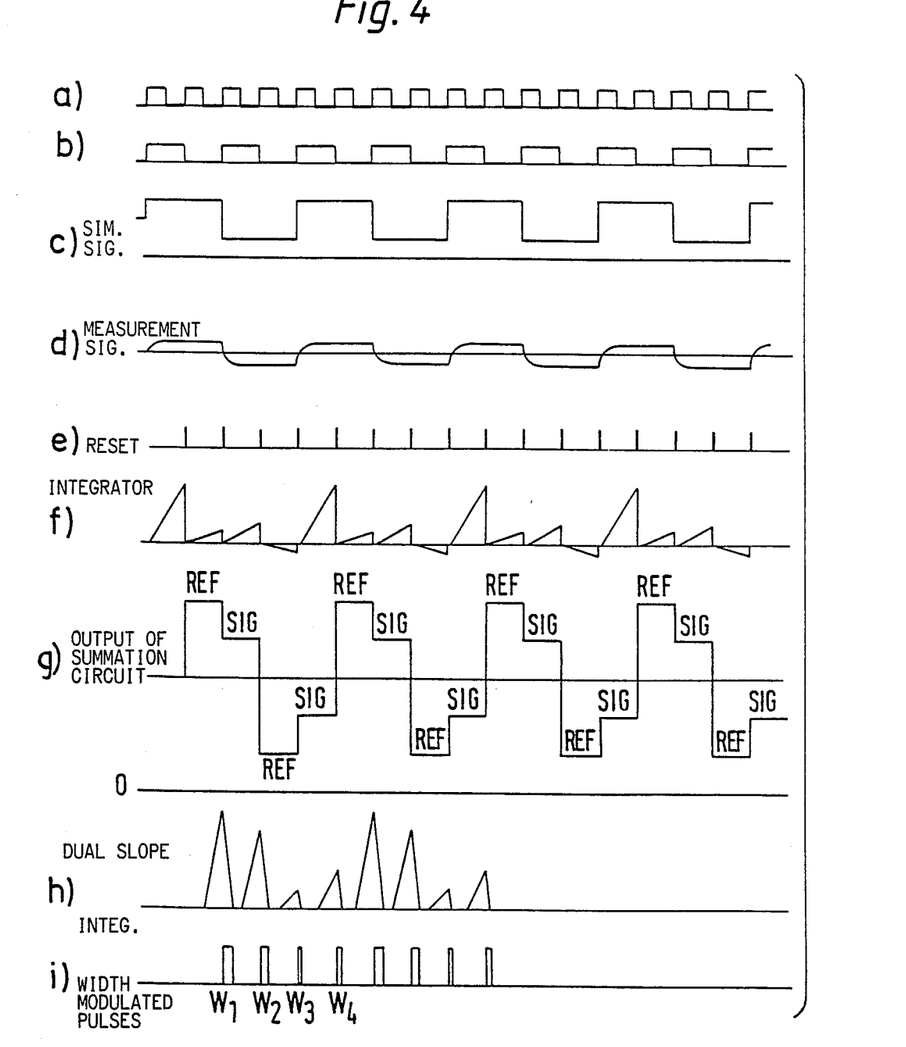
FIG. 4 shows the time behaviour of signals at different positions of the flow meter of FIG. 1.

FIG. 4 illustrates a few functional signal courses of FIGS. 1 and 2. In FIG. 1, the conductors for the respective signals are referenced with the letters of the corresponding lines.

The cycle generator 25 produces first cycle pulses which are shown in FIG. 4a. From this cycle signal, the reset pulses (FIG. 4e) are produced in the pulse former 27 for each rising flank of the cycle pulse. A second cycle pulse (FIG. 4b) has half the cycle frequency of the first cycle pulse a. The simulating signal (FIG. 4c) is in the present case in the form of a positive rectangular voltage synchronous with the measurement (FIG. 4d). FIG. 4f shows the output voltage of the integrator. FIG. 4g shows the output voltage of the summation circuit 20. The latter is sectionally constant because the storage positions 14 to 18 of the shift register 13 retain the output value of the integrator 12 at a certain instant and are changed only on the occurrence of a new cycle pulse. FIG. 4h shows the output of the dual slope integrator and FIG. 4i shows the width modulated pulses supplied by the microprocessor 24.

During the first $\frac{1}{4}$ period, the integrator 12 is connected through the switch 8 to the simulating signal generator 7. The high positive simulating quantity (FIG. 4c) in this $\frac{1}{4}$ period allows the integrator output voltage to rise to a relatively high value until the integrator is set back to zero by the reset pulse (FIG. 4e). During the next $\frac{1}{4}$ period, the integrator 12 is connected through the switch 8 to the measurement (FIG. 4d). The value of this quantity is in this example a smaller positive value than the preceding simulating quantity and lets the integrator 12 rise to a relatively small voltage until the voltage is set back to zero again by the reset pulse (FIG. 4e). During the following $\frac{1}{4}$ period, the integrator is again connected to the simulating signal generator 7 which now delivers a low positive voltage, which again causes a relatively small positive voltage at the integrator output. During the last $\frac{1}{4}$ period, the integrator 12 is again connected to the measurement which, by reason of a reversed magnetic field in comparison with the second ¼ period, is now negative so that the output value of the integrator 12 rises to a negative value. The illustrated output voltage (FIG. 4f) of the integrator 12 is from a non-inverting integrator. In using the reversing integrator shown in FIG. 2, the output values of the integrator have the reverse sign. The measurement shown in FIG. 4d is an ideal measuring voltage without interference voltages or displacements of the direct current level. However, the actual measuring signal always has an interference voltage superimposed on it which could be a thousand times higher than the actual measuring voltage. For this reason, the illustrated integrator signal (FIG. 4f) is also an idealised representation. In practice, there are much larger differences between the individual voltages. Consequently, this integrator signal cannot be directly converted into a digital signal without losing an important part of the information during the analogue/digital conversion.

Every time the change-over switch 8 is changed over, the integrator 12 is reset to zero by a reset pulse. Simultaneously, the output value reached by the integrator 12 is stored in the first storage position 14 of the shift register 13 whilst the previous stored contents are shifted by one storage position to the right. Accordingly, only those values are applied to the summation circuit 20 which are constant during a half switching period of the change-over switch 8. The dual slope integrator 23 integrates the output voltage of the summation circuit 20 over half this period. At the end of this period, the second change-over switch 21 changes over, whereupon the integrator produces a decreasing voltage with a constant voltage of the reference signal generator 22. The duration for which the integrator 23 produces a decreasing flank is a measure of the width of the pulse appearing at the output of the pulse width modulator 23. The lower the input voltage of the dual slope integrator, the less time is required by the voltage of the reference signal generator 22 to bring the output voltage of the integrator back to zero again and the narrower is the pulse at the output of the pulse width modulator 23.

The pulses with different widths are fed to the microprocessor 24 which determines the flow from the quotient of the difference of the widths of the pulse W4 and the width of the pulse W2 and the difference of the width of the pulse W3 and the width of the pulse W1. This quotient merely has to be multiplied by a constant in order to arrive at the true flow.

Figures 5, 6:
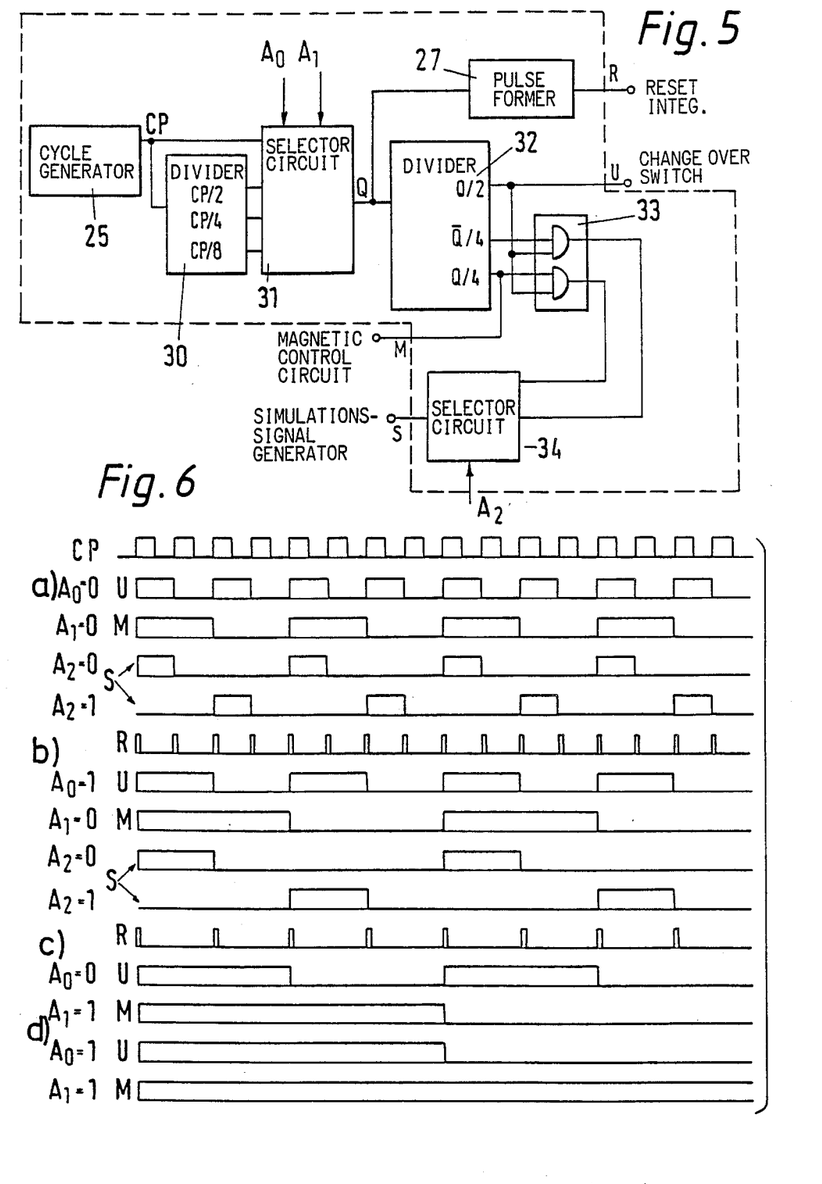
FIG. 5 shows a further embodiment of the cycle producing device.
FIG. 6 is a time diagram of quantities of the cycle producing device of FIG. 4.

The flow meter of FIG. 1 is operated at a constant cycle frequency of the cycle generator 25. FIG. 5 shows another embodiment of the cycle pulse producing circuit 10. The cycle of the cycle generator 25 is not passed through a fixed divider 26 but through a divider 30 to a selector circuit 31. The divider 30 which can, for example, be constituted by the circuit CMOS 4520 divides the cycle frequency by two, by four and by eight. The selector circuit 31 which may, for example, be constituted by a multiplexer CMOS 4052 is therefore supplied with four cycle signals of which the frequencies are in the ratio 1:2:4:8. By way of the quantities $A_0$ and $A_1$, one can select which frequency is to appear at the outlet Q. One can thereby adapt the change-over frequency of the switch 8 and thus the period of the magnetic control circuit and the simulating signal generator to suit different requirements. The selected frequency is determined by the two quantities $A_0$ and $A_1$. When both quantities are zero, the frequency of the output signal CP of the cycle generator 25 directly reaches the outlet Q of the selector circuit 31. For $A_0=1$, $A_1=0$, the frequency is halved and for $A_0=0$ and $A_1=1$, it is divided by four and if both quantities are 1, it is divided by 8. The signal Q is fed direct to the pulse former 27 which produces a reset signal R for each rising flank of the signal Q. The signal Q is halved in a divider 32. The output signal Q/2 is fed to the change-over switch 8. The divider 32 likewise divides the signal Q by the factor 4 and leads the output signal Q/4 to the magnetic control circuit 4.

The different cycle frequencies which may thus be selected enables different values to be employed for the magnetising frequencies in order thereby to change the time constants of the meter. Since the simulating frequency is to be adapted to the magnetising frequency, one can in this way also ensure operation of the meter for different magnetising frequencies.

In contrast with the FIG. 1 circuit and the signal courses of FIG. 4, where the simulating quantity always remained constant over half a period, the simulating signal generator 7 is differently controlled in the present example. Since the simulating quantity is only scanned in every first and third ¼ period, the simulating signal can also have a pulse width of only ¼ period with one value and of ¾ periods with another value. For example, for ¼ period, one can produce the FIG. 3 signal of 5 mV whilst over ¾ period the value 0 V is produced. For calculating the flow, it makes no basic difference whether the simulating quantity is of the same phase as the measurement or displaced through 180°. To produce this simulating control signal, the divider 32 not only produces the signal Q/4 but also the inverse signal $\overline{Q4}$. By means of a logic circuit 33, a signal is then produced which corresponds to the signal U in which every second pulse is omitted. For a signal of the same phase as the magnetic control signal M, one of the two output leads of the gate 33 is employed whereas for the other case the other lead is employed. Which signal is used in the end is determined in the selector circuit 34 depending on a quantity $A_2$.

FIG. 6 illustrates the signal courses of the magnetic control signal M and the change-over control signal U for four different manners of operation and the simulating control signal S and the reset signal R for two different types of operation.

For the case when $A_{2b}=0$, the simulating control signal S is of the same phase as the magnetic control signal M. For $A_2=1$, it is displaced in phase through 180°. The problem could occur where the simulating control signal and the simulating quantity influence the electrode arrangement or the integrator. If one uses the simulator control with $A_2=0$, this means that mainly the positive flow measuring period is influenced whereas the other manner of operation ($A_2=1$) mainly influences the negative measuring period. To eliminate this error, one periodically alternates between the two possible simulator controls so that any contributions of error cancel each other.

We claim:

1. A magnetically inductive flowmeter comprising, tube means for guiding a flow of material, coil means for generating a magnetic field extending transversely relative to said tube means, magnetic field control means for generating an alternating measurement voltage across said coil means, electrode means arranged perpendicular to said tube means and said magnetic field, signal generating means for generating an alternating simulated signal, signal evaluating circuit means for evaluating said coil measurement voltage, changeover switch means having input means connectable alternately to said electrode means and said signal generating means, cycle generator means for setting equal and in phase periods for said magnetic field control means and said signal generating means and for operating said switch at quarterly periods so that quarter period sections of said signal generating means simulated signal and said coil means alternating measurement voltage are sequentially directed to said signal evaluating circuit means for a coil measurement voltage evaluation based on and facilitated by both said coil measurement voltage and alternating simulated signal.

2. A magnetically inductive flow meter according to claim 1 wherein it is the second and fourth quarter sections of said coil means alternating measurement voltage that are directed to said signal evaluating circuit means.

3. A magnetically inductive flow meter according to claim 1 wherein said evaluating circuit means includes comparison means for evaluating said coil means alternating measurement voltage.

4. A magnetically inductive flow meter according to claim 1 wherein said evaluating circuit means stores successive instantaneous values of said coil measurement voltage and said simulated signal are serial stored in successive storage positions.

5. A magnetically inductive flow meter according to claim 4 including shift means wherein said values in said successive storage positions are shifted upon the generation of a new output value by said switch means.

6. A magnetically inductive flow meter according to claim 4 wherein at least two of said storage positions are utilized for evaluating said coil measurement voltage.

7. A magnetically inductive flow meter according to claim 4 wherein values of said coil measurement voltage and said simulated signal are separately read out from said storage positions and processed.

8. A magnetically inductive flow meter according to claim 7 including means for calculating the flow rate of said flow meter based on the ratio of said values of said coil measurement voltage to values of said simulated signal.

9. A magnetically inductive flow meter according to claim 4 wherein at least three successive output values of said coil measurement voltage are stored and processed together.

10. A magnetically inductive flow meter according to claim 9 including pulse width modulating means for generating variable width pulses corresponding to said values of said coil measurement voltage.

11. A magnetically inductive flow meter according to claim 4 including three of said successive storage positions, and means for forming a summation value equal to the difference between twice the value of the second position and the sum of the values of the first and third positions.

* * * * *